US010844736B2

(12) United States Patent
Bulot et al.

(10) Patent No.: US 10,844,736 B2
(45) Date of Patent: Nov. 24, 2020

(54) STRAIGHTENER VANE AND STRUCTURAL ARM CONNECTED IN A PRIMARY FLOW PATH

(71) Applicant: SAFRAN AIRCRAFT ENGINES, Paris (FR)

(72) Inventors: Benjamin Bulot, Moissy-Cramayel (FR); Guillaume Claude Robert Belmon, Moissy-Cramayel (FR); Eva Julie Lebeault, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 293 days.

(21) Appl. No.: 16/115,879

(22) Filed: Aug. 29, 2018

(65) Prior Publication Data

US 2020/0024990 A1   Jan. 23, 2020

(30) Foreign Application Priority Data

Aug. 30, 2017  (FR) ..................................... 17 57997

(51) Int. Cl.
*F01D 9/04* (2006.01)
*F04D 29/54* (2006.01)

(52) U.S. Cl.
CPC ........... *F01D 9/041* (2013.01); *F04D 29/541* (2013.01); *F05D 2240/12* (2013.01); *F05D 2260/40* (2013.01)

(58) Field of Classification Search
CPC ........ F04D 29/54; F04D 29/541; F01D 9/041; F01D 25/28; F05D 2240/12; F05D 2260/40
See application file for complete search history.

(56) References Cited

U.S. PATENT DOCUMENTS

| | | | | |
|---|---|---|---|---|
| 9,068,460 | B2 * | 6/2015 | Suciu | ........................ F01D 1/04 |
| 10,577,956 | B2 * | 3/2020 | Northall | .................. F01D 9/041 |
| 10,697,471 | B2 * | 6/2020 | Northall | ................ F01D 25/162 |
| 2013/0259672 | A1 | 10/2013 | Suciu et al. | |
| 2015/0143794 | A1 | 5/2015 | Schwarz et al. | |
| 2016/0153356 | A1 | 6/2016 | Schwarz et al. | |
| 2017/0074165 | A1 | 3/2017 | Schwarz et al. | |
| 2018/0038235 | A1 | 2/2018 | Damevin et al. | |

FOREIGN PATENT DOCUMENTS

FR        3 032 480 A1    8/2016

OTHER PUBLICATIONS

French Preliminary Search Report and Written Opinion dated Apr. 24, 2018 in Patent Application No. 1757997 (with English language translation of categories of cited documents).

* cited by examiner

*Primary Examiner* — Richard A Edgar
(74) *Attorney, Agent, or Firm* — Oblon, McClelland, Maier & Neustadt, L.L.P.

(57) ABSTRACT

An assembly for a primary flow path of a double flow turbomachine extending along a longitudinal axis including a reduction gear, configured to drive a fan in rotation, a stator including a plurality of vanes for straightening the primary flow path, and an intermediate casing, positioned downstream of the stator, including structural arms with fairings passing through the primary flow path, wherein a fairing and one straightening vane are connected together within the primary flow path by a connecting surface, the fairing and the vane being positioned longitudinally substantially at the reduction gear.

11 Claims, 4 Drawing Sheets

STRAIGHTENER VANE AND STRUCTURAL ARM CONNECTED IN A PRIMARY FLOW PATH

GENERAL TECHNICAL FIELD

The invention relates to double flow turbomachines for aircraft with architectures of the type having a fan driven by a reduction gear, known under the generic names of UHBR (ultra-high bypass ratio) or geared turbofan, i.e. turbomachines in which the fan rotates less quickly than the low-pressure compressor, generally called the booster.

More specifically, the invention relates to the primary flow path of such a turbomachine.

PRIOR ART

Figure 1:
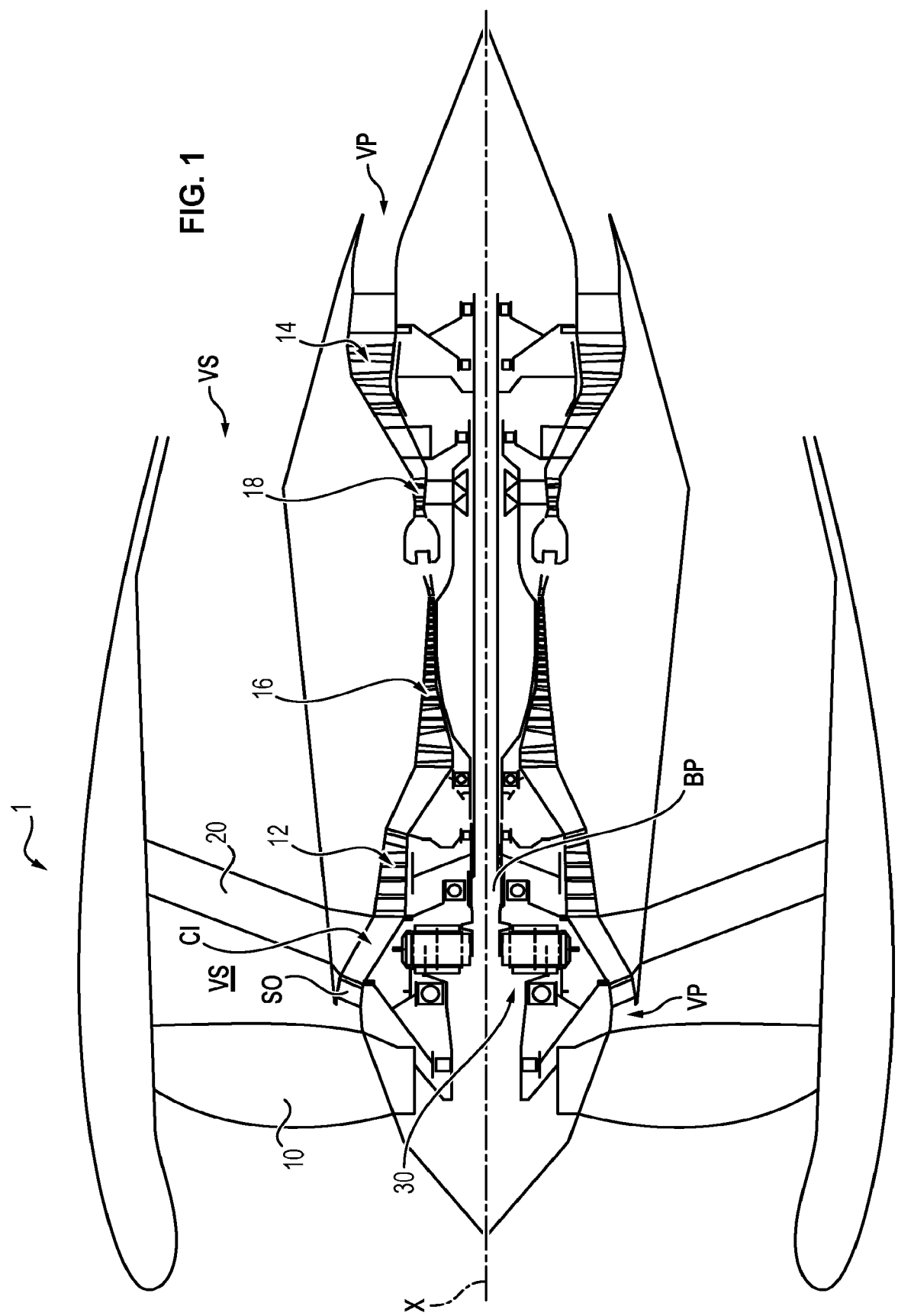

A double flow turbomachine 1 for aeronautical propulsion is shown schematically in FIG. 1. It comprises a fan 10 delivering a flow of air of which a central portion, called the primary flow, is injected into a primary flow path VP comprising a low-pressure compressor 12 which feeds a turbine 14 driving the fan via a low-pressure shaft BP, and a high-pressure compressor 16 which feeds a high-pressure turbine 18 via a high-pressure shaft. The turbomachine extends along a longitudinal axis X.

The air passing the fan 10 then passes through a stator S0, which comprises a plurality of vanes 40 which has the purpose of straightening the flow, before it enters the low-pressure compressor, also called the booster.

The peripheral portion of the air flow, called the secondary flow, is for its part ejected to the atmosphere to supply the major portion of the thrust of the turbomachine 1, after having passed through a ring 20 of fixed vanes which form in particular a secondary flow path VS.

In the case of a fan driven by a reduction gear, the connection between the low-pressure shaft BP and the fan 10 is not direct, but is accomplished via a reduction gear 30.

This reduction gear 30 is generally a planetary gear train, with a sun gear, planet gears, and planet gear carriers. The reduction gear is a heavy part, which receives considerable power: it must therefore be structurally supported and abundantly lubricated and cooled.

To this end, the turbomachine comprises an intermediate casing CI situated between the stator S0 and the low-pressure compressor 12 (more precisely the IGV—inlet guide vane—of the low-pressure compressor 12, which can have variable pitch). The intermediate casing CI comprises structural arms 40 which participate in retaining the engine in its environment in the airplane, in particular in supporting its inter flow paths compartment commonly called the "core compartment" of the turbomachine. These structural arms 40 pass through the primary flow path VP and comprise an aerodynamic fairing 41 so as to have a minimum impact on the streaming of the flow. They also allow the transfer of power, the passage of utilities, such as cables and oil pipes.

Due to the presence of a reduction gear 30, which must be structurally supported, these turbomachines 1 have a different architecture from turbomachines in which the fan is driven directly by the low-pressure shaft. In particular, the intermediate casing CI of these machines with direct drive of the fan is situated generally between the compressors. It is thus not positioned at the same location in a reduction gear motor compared with a motor with direct drive of the fan.

Due to this different positioning, the intermediate casing CI behaves differently and creates head losses in the primary flow path VP which impair the performance of the engine.

PRESENTATION OF THE INVENTION

The invention proposes a solution which allows these head losses to be reduced. To this end, the invention proposes an assembly for a primary flow path of a double flow turbomachine extending along a longitudinal axis comprising:
  a reduction gear configured to drive a fan in rotation,
  a stator comprising a plurality of vanes for straightening the primary flow path,
  an intermediate casing, positioned downstream of the stator, comprising structural arms with fairings passing through the primary flow path,
  the assembly being characterized in that at least one fairing and one straightening vane are connected together within the primary flow path by a connecting surface, said fairing and said vane being positioned longitudinally substantially at the reduction gear.

Within the scope of the invention, these two parts are aerodynamically combined, but each retains its function.

The invention can comprise the following features, taken alone or in combination:
  the straightening vane comprises a suction side and a pressure side, and
  two connecting surfaces, respectively suction side and pressure side, are provided for, on the one hand to connect the suction side of the straightening vane to one face of the fairing situated on the same side as the suction side, and on the other hand to connect the pressure side of the straightening vane to one face of the fairing, situated on the same side as the pressure side,
  the connecting surface is a surface formed by adding an additional part, attached to the fairing and to the straightening vane,
  the connecting surface is integrated into the fairing and the straightening vane, so that they form a single-piece assembly,
  a trailing edge is defined for the fairing, in which the connection between the connecting surface and the structural arm is accomplished between 60 and 90% of the length of the chord of the fairing, starting at the trailing edge,
  the connection between the connecting surface and the structural arm is accomplished at the master cross section of the structural arm,
  a leading edge is defined for the straightening vane, in which the connection between the connecting surface and the straightening vane is accomplished between 20 and 40% of the length of the chord of the vane, starting at the leading edge,
  the connection is accomplished by a tangent constraint,
  a utility passes between the two connecting surfaces,
  the stator comprises between 60 and 100 straightening vanes and the intermediate casing comprises between 6 and 10 structural arms, each structural arm being preferably connected to a straightening vane.

The invention also relates to a turbomachine comprising a secondary flow path and a primary flow path and a fan disposed upstream of the two flow paths, characterized in that it comprises an assembly as previously described, the fan being driven by the reduction gear.

The invention proposes an assembly method for an assembly as previously defined, comprising a step consisting of attaching the connecting surface in the form of an additional part to the fairing and to the straightening vane.

PRESENTATION OF THE FIGURES

Figure 2:
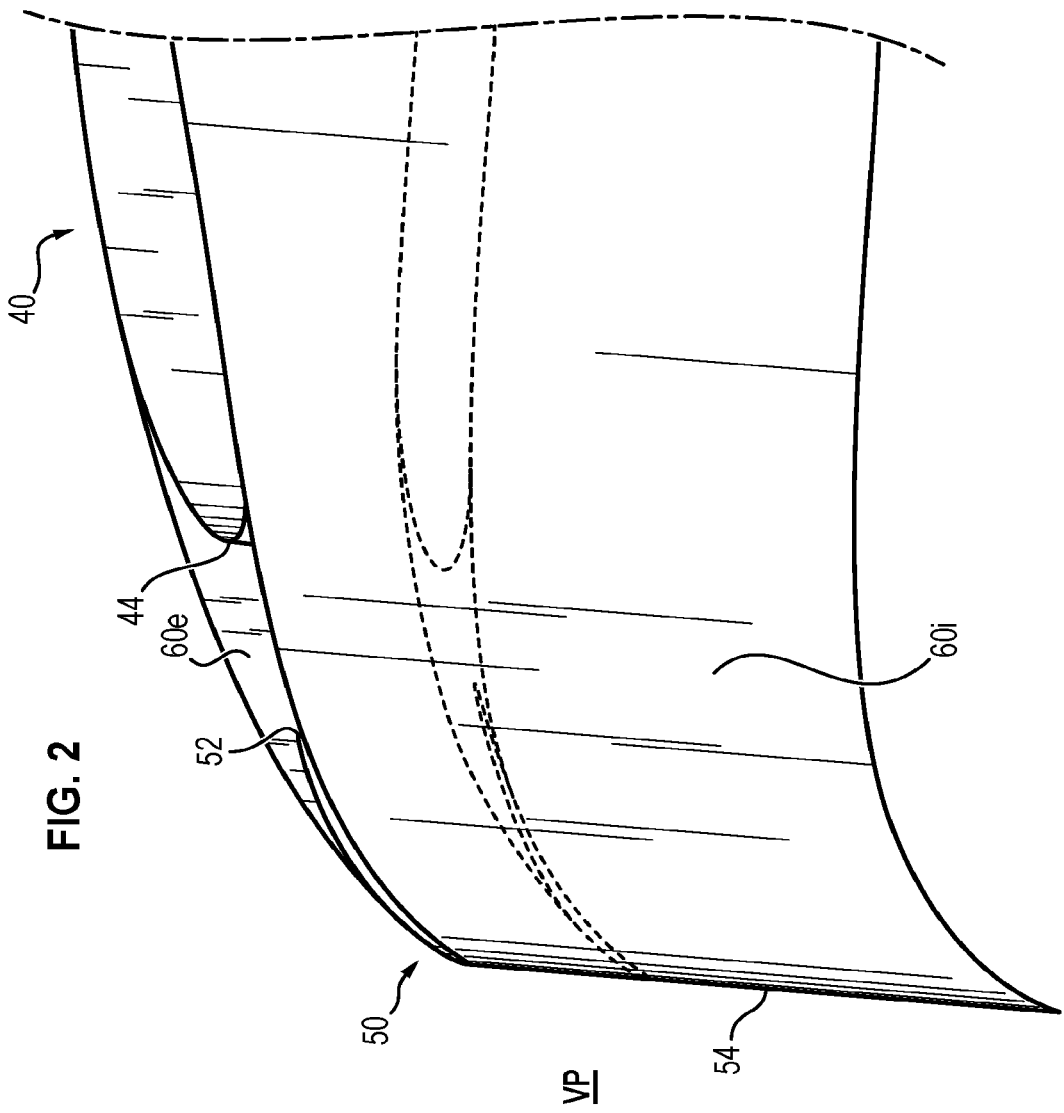
Figure 3:
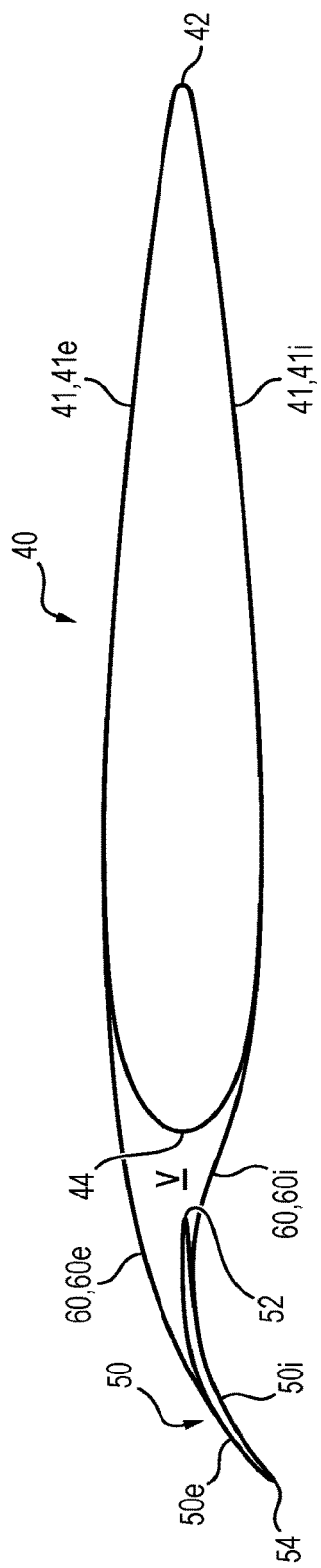
Figure 4:
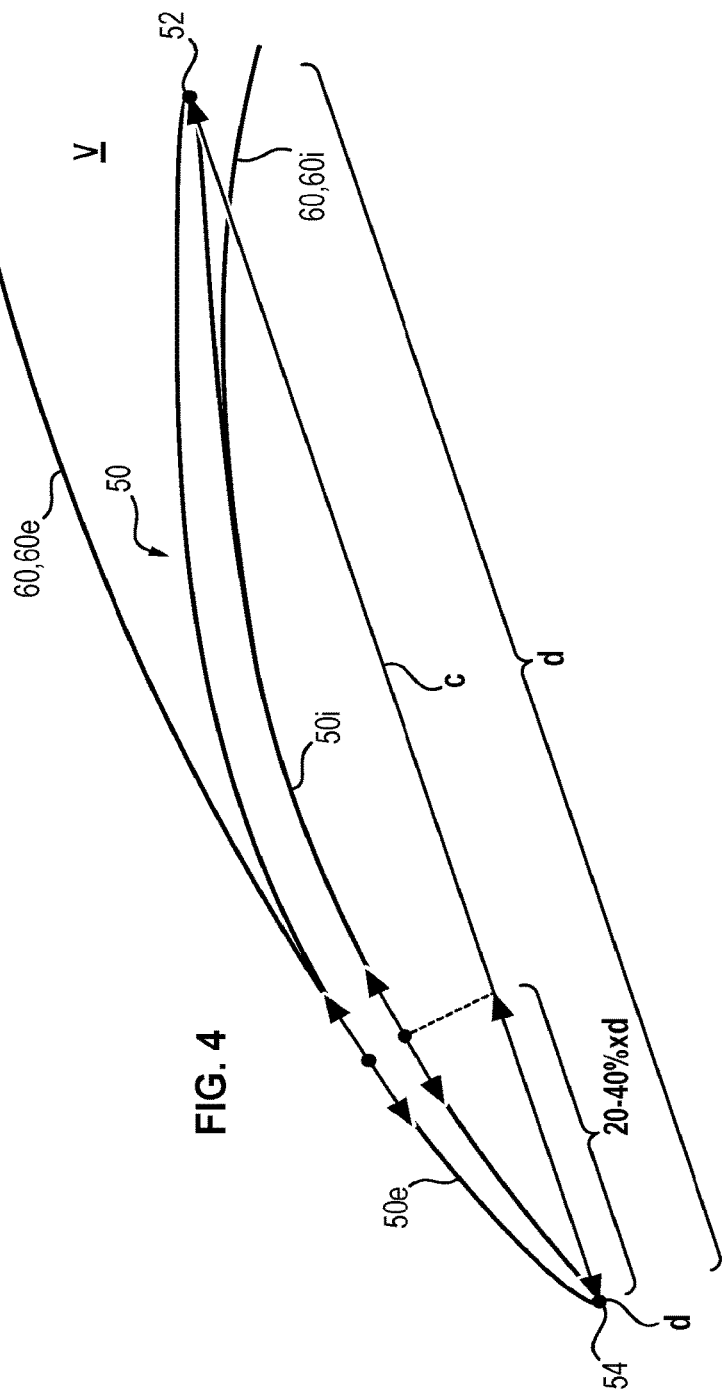
Figure 5:
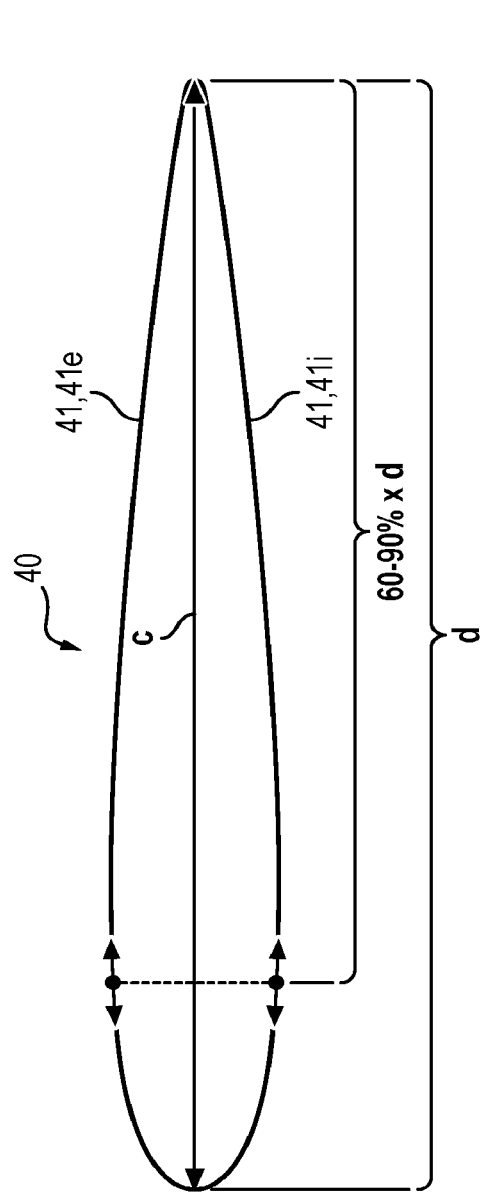
Figure 6:
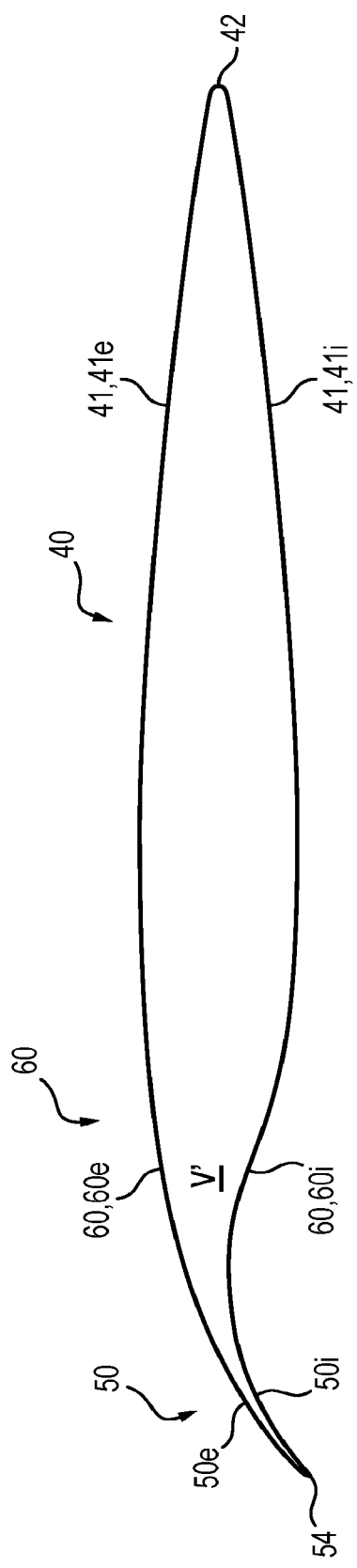

Other features, aims and advantages of the invention will be revealed by the description that follows, which is purely illustrative and not limiting, and which must be read with reference to the appended drawings, in which:

FIG. 1 illustrates schematically a turbomachine according to the prior art, and particularly a primary flow path, to which the invention can be applied, FIG. 2 illustrates a three-dimensional view of an embodiment of the invention, FIGS. 3 to 5 illustrate a section view, according to a plane orthogonal to the radial extension of a straightening vane and to the azimuthally aligned structural shaft, according to one embodiment of the invention, FIG. 6 illustrates the same view, according to one embodiment of the invention.

DETAILED DESCRIPTION

An assembly for a primary flow path VP of the turbomachine will be described with reference to FIG. 2.

The turbomachine 1, already presented in the introduction, comprises a fan 10 upstream of a secondary flow path VS and a flow path VP, driven in rotation by a reduction gear 30. It extends along a longitudinal axis X. Along the primary flow path VP, the air flow passes through a stator S0, an intermediate casing CI, then enters into the compressors 12, 16, a combustion chamber, then the turbines 14, 18.

The stator S0 comprises a plurality of straightening vanes 50, distributed circumferentially in the primary flow path VP and extending radially from a hub. In particular, the vanes number between 60 and 100, generally around 80.

The straightening vanes 50 have as their function to straighten the flow leaving the fan 10. Each straightening vane 50 comprises a trailing edge 52, a leading edge 54, the trailing edge 52 being downstream with respect to the leading edge 54 in the direction of flow in the primary flow path VP. A chord c is defined, which is the segment connecting the trailing edge 52 to the leading edge 54. A suction side 50*e* and a pressure side 50*i* are defined, which correspond to the respectively convex and concave faces of the straightening vane 50.

Within the scope of the invention, certain vanes 50 may not have a trailing edge, as will be explained below.

The intermediate casing CI comprises a plurality of structural arms 40 distributed circumferentially in the primary flow path VP and extending radially, each comprising an aerodynamic fairing 41. In particular, the arms number between 6 and 10, 8 for example.

The fairing 41 and the vane 50 are longitudinally position at, or substantially at the reduction gear 30. In other words, they are situated radially around the reduction gear 30.

These structural arms 40 can have as their function to carry in particular the reduction gear 30, thus contributing to taking up forces, and/or transferring power (for example for an accessory gearbox), and/or passing utilities, such as electrical power or control cabling, or oil pipes for lubrication and cooling. Only the fairing 41 is shown in the figures. Generally, the presence of the internal structure necessary for ensuring the aforementioned functions is manifested in the form of a "keep-out zone" which constrains the design of the engine by restraining the zones available for provisions of the aerodynamic type for example.

The fairings 41 have as their function to limit as much as possible the aerodynamic perturbations in the streaming of the primary flow.

Each fairing 41 comprises a trailing edge 42, a leading edge 44, the trailing edge 42 being downstream with respect to the leading edge 44 in the direction of flow in the primary flow path VP. The chord c, which is the segment connecting the trailing edge 42 to the leading edge 44. A suction side 50*e* and a pressure side 50*i* are defined, which correspond to the respectively convex and concave faces of the straightening vane 50.

Within the scope of the invention, the fairings 41 may not have a leading edge 44 properly so called, as will be explained below.

A structural arm 40 comprises a master cross section, which corresponds to the zone the section substantially transverse to the flow or perpendicular to the chord of which is a maximum, that is the zone which generally has the most important aerodynamic impact. This is the zone in which the thickness of the arm or the distance between the suction side and the pressure side is maximum. It is generally situated between 60 and 90% of the length d of the chord c, starting from the trailing edge 42. It will be noted that the tangent to the fairing 41 at the master cross section is parallel to the longitudinal axis X of the turbomachine 1 (in a plane orthogonal to the radial extension of the structural arm 40).

As illustrated in FIG. 2, a straightening vane 50 and an aerodynamic structural arm 40 fairing 41 are connected to one another by a connecting surface 60. This connecting surface 60 allows the straightening vane 50 to be integrated with the fairing 41.

More specifically, two connecting surfaces 60*e*, 60*i* are provided for, one surface 60*e* for the suction side 50*e* of the straightening vane 50 and the face 41*e* of the fairing 41 situated on the same side (which will be called the suction side face) and a surface 60*i*, opposite to the surface 60*e*, for the pressure side 50*i* of the straightening vane 50 and the face 41*i* of the fairing 41 situated on the same side (which will be called the pressure side face), which is the side opposite the face 41*e*.

The presence of the connecting surfaces 60*e*, 60*i* allows the elimination of the stagnation points situated at the leading edge of the fairing 41 of the structural arm 40 downstream of the straightening vanes 50. In fact, the Applicant has noticed that due to the constraints particular to the primary flow path VP, phenomena occurred which were nonexistent in the secondary flow path VS, particularly at the ring 20.

Aerodynamically, the straightening vane 50 and the structural arm 40 now only form a single part.

Preferably, each structural arm 40 is connected to a straightening vane 50. The straightening vane 50 concerned is that which is, logically, at the same azimuth or substantially at the same azimuth as the structural arm 40.

As there is a greater number of straightening vanes 50 than structural arms 40, there will therefore be a stator S0 comprising mostly unconnected straightening vanes, and a number of connected straightening vanes 50 equal to the number of structural arms 40.

Two particular embodiments are distinguished: a first embodiment in which the connecting surface 60 is an additional part, attached to the fairing 41 and to the straightening vane 50, and a second embodiment in which the connecting surface 60 is integrated with the fairing 41 and the straightening vane 50 to form a single-piece assembly.

First Embodiment (FIGS. 3 to 5)

In the first embodiment, the connecting surface 60 is one part, typically a plate made of sheet metal or a plate made of composite which is attached to the fairing 41 and to the straightening vane 50.

The attachment can be accomplished by gluing, welding, screwing, riveting, etc. depending on the materials used.

The connection can be made on the fairing 41 at the master cross section, that is in the maximum perimeter zone. By "at" is meant at more or less 10% of the length of the chord c on either side of the master cross section. The measurement is accomplished by orthogonal projection from the chord c on the fairing 41.

The connection can be made to the fairing 41 between 60 and 90% of the length of the chord c from the trailing edge 42, preferably between 70 and 80%. The master cross section is generally also located in this interval.

The trailing edge of the fairing 41 is retained.

The aerodynamic profile is optimized by respecting these constraints.

The connection can be made on the straightening vane 50 at between 20 and 40% of the length of the chord c starting from the leading edge 54, preferably between 25 and 35%. The measurement is accomplished by orthogonal projection from the chord c to the straightening vane 50.

Now that the placing of the connections has been given, it is incumbent to define the type of connection. To minimize the aerodynamic impact, the connection is accomplished by tangential constraint, meaning that the connection point, the tangent to the surface 60e, 60i is congruent with the tangent to the fairing 41e, 41i or the vane 50e, 50i (for the suction sides and the pressure sides, respectively). In other words, the junction defines a continuous surface (which is accomplished by the very fact of the connection) and differentiable at least once (which is accomplished by the very fact of the congruent tangents). This is illustrated by the arrows in FIGS. 4 and 5.

In this embodiment, a volume V is formed by the two surfaces 60e, 60i and by the fairing 41 and the straightening vane 50. It is possible to have the utilities pass in this volume V. A greater space is thus won for the passage of utilities.

This embodiment allows retaining relatively standard manufacturing for the stator S0 and for the intermediate casing CI, because it is sufficient to add parts.

Second Embodiment (FIG. 6)

In the second embodiment, the fairing 41, the straightening vane 50 and the connecting surfaces 60e, 60i are made of the same unique part.

As the distinct functions of the structural arm 40 and of the straightening vane 50 continue to be provided independently, it is considered that the turbomachine still comprises a structural arm 40 and a straightening vane 50, even if the two parts are manufactured in one piece.

The same constraints in terms of positioning and connection are verified. However, the leading edge 44 of the structural arm 40 and the trailing edge 52 of the straightening vane 50 no longer have to be manufactured because they are no longer situated in the flow of the primary flow path VP, but in the volume created by the connecting surfaces 60e, 60i.

Thus the notions of chord for the structural arm 40 as previously defined can no longer apply. On the other hand, as the structural arm 40 retains its master cross section, the definition of positioning based on the master cross section remains valid.

On the other hand, the notion of chord for the straightening vanes 50 as defined can continue to apply to the extent that there exist straightening vanes 50 which are not integrated in a structural arm 40 and which can serve as references for the calculation of positioning given previously.

In this embodiment, a volume V' is formed by the two surfaces 60e, 60i, and by the fairing 41 and the straightening vane 50, greater than the volume V. In addition, the volume V' is continuous with the available space in the interior of the fairing 41. It is thus possible to have more utilities in this volume V' than in the base volume of the fairing 41.

This embodiment allows avoiding the manufacture of portions of straightening vanes 50 and of structural arms 40 which, being situated in the volume V of the first embodiment, no longer carry out their specific function.

Supplementary Embodiments

It is also possible to provide connecting surfaces 60 in the form of additional part with a straightening vane 50 without a trailing edge 52 and a structural arm 40 without a leading edge 44. In other words, this corresponds to the second embodiment except that the elements are assembled parts and are not integrally formed.

It is also possible to provided a connecting surface integrally formed with the straightening vane 50 and the fairing 41 of the structural arm 40, with a straightening vane 50 having a trailing edge 52 and a fairing 41 with a leading edge 44. In other words, this corresponds to the first embodiment, except that the elements are integrally formed parts.

The embodiments, however, though technically possible, do not optimize quantities of material or manufacturing methods.

The invention claimed is:

1. An assembly for a primary flow path of a double flow turbomachine extending along a longitudinal axis comprising:
    a reduction gear configured to drive a fan in rotation,
    a stator comprising a plurality of straightening vanes for straightening a primary steam,
    an intermediate casing, positioned downstream of the stator, comprising structural arms with fairings passing through the primary flow path,
    wherein at least one fairing and one straightening vane are connected together within the primary flow path by at least one connecting surface, said fairing and said straightening vane being positioned longitudinally substantially at the reduction gear,
    wherein a leading edge is defined for the straightening vane, and
    wherein a connection between the connecting surface and the straightening vane is accomplished between 20 and 40% of a length of a chord of the straightening vane, starting at the leading edge.

2. The assembly according to claim 1, wherein
    the straightening vane comprises a suction side and a pressure side, and
    the fairing and the straightening vane are connected together within the primary flow path by a suction side connecting surface and a pressure side connecting surface, the suction side connecting surface connecting the suction side of the straightening vane to a first face of the fairing situated on a same side as the suction side of the straightening vane, and the pressure side connecting surface connecting the pressure side of the straightening vane to a second face of the fairing situated on a same side as the pressure side of the straightening vane.

3. The assembly according to claim 2, wherein a utility passes between the suction side connecting surface and the pressure side connecting surface.

4. An assembly method for an assembly according to claim 2, comprising attaching at least one of the suction side connecting surface and the pressure side connecting surface in a form of an additional part to the fairing and to the straightening vane.

5. The assembly according to claim 1, wherein the connecting surface is a surface formed by adding an additional part, attached to the fairing and to the straightening vane.

6. The assembly according to claim 1, wherein a trailing edge is defined for the fairing, and wherein another connection between the connecting surface and the structural arm is accomplished between 60 and 90% of a length of a chord of the fairing, starting at the trailing edge.

7. The assembly according to claim 6, wherein the another connection between the connecting surface and the structural arm is accomplished at a master cross section of the structural arm.

8. The assembly according to claim 1, wherein the connection is accomplished by a tangent constraint.

9. The assembly according to claim 1, wherein the stator comprises between 60 and 100 straightening vanes and the intermediate casing comprises between 6 and 10 structural arms, each structural arm being connected to a straightening vane.

10. A turbomachine comprising a secondary flow path and a primary flow path and a fan disposed upstream of the two flow paths, comprising an assembly according to claim 1, the fan being driven by the reduction gear.

11. An assembly for a primary flow path of a double flow turbomachine extending along a longitudinal axis comprising:
    a reduction gear configured to drive a fan in rotation,
    a stator comprising a plurality of straightening vanes for straightening a primary steam,
    an intermediate casing, positioned downstream of the stator, comprising structural arms with fairings passing through the primary flow path,
    wherein at least one fairing and one straightening vane of the plurality of straightening vanes are connected together within the primary flow path by a connecting surface integrated into the fairing and the one straightening vane of the plurality of straightening vanes so as to form a single-piece assembly, said fairing and the one straightening vane of the plurality of straightening vanes being positioned longitudinally substantially at the reduction gear,
    wherein a leading edge is defined for the plurality of straightening vanes, and
    wherein a connection between the connecting surface and the one straightening vane of the plurality of straightening vanes is accomplished between 20 and 40% of a length of a chord of another straightening vane of the plurality of straightening vanes.

* * * * *